Dec. 30, 1930. P. N. PETERS 1,787,282
SNUBBER
Filed March 1, 1928

Inventor:
Peter Nicholas Peters,
By his Attorney
Alexander Chessin

Patented Dec. 30, 1930

1,787,282

UNITED STATES PATENT OFFICE

PETER NICHOLAS PETERS, OF BROOKLYN, NEW YORK

SNUBBER

Application filed March 1, 1928. Serial No. 258,316.

My invention relates to motion controlling devices and, more particularly, to devices of this character for checking the recoil of a spring connection between elements of a mechanism.

Devices of the latter class, when used on spring suspended vehicles, are commonly known as "shock absorbers." In the so called "one way" shock absorbers, or "snubbers," the springs themselves are depended upon to absorb the shocks suffered by a vehicle moving over an uneven road, the function of the shock absorber being that of retarding the recoil from the compression of the spring. The present invention is concerned with snubbers, or one way shock absorbers, of the drum and band type.

The invention involves the application of a new principle of operation which readily differentiates it from other snubbers of the same type. In the latter, the controlling function resides in a more or less powerful counteracting spring, in combination with frictional resistance to motion. Some manufacturers claim that in their snubber the counteracting spring has no other function than that of rewinding the band, but this contention clearly involves a fallacy. It takes as much energy to rewind a band on a drum as it takes to unwind it, assuming equal resistance in both cases. If the counteracting spring were of small power, a correspondingly high frictional resistance between the drum and the band would be necessary to effect the desired snubbing action, but, in rewinding the band on the drum, the same frictional resistance would have to be overcome, and this could not be accomplished by a rewinding spring of small power. Thus, the assumption of a low power counteracting spring leads to obviously contradictory conclusions. The power of the rewinding spring, while not necessarily of the same order as the power of the spring the recoil of which the device is intended to snub, must be substantial and, as a matter of fact, commensurate with the power of the opposing spring, and, if it is substantial, then the rewinding spring is bound to function as a counteracting spring also, opposing the recoil movement. There is a certain interdependence between the counteracting spring and the frictional resistance in these devices which sets definite limits on both. The frictional resistance can not be made arbitrarily high, nor the tension of the counteracting spring arbitrarily low. Unless the counteracting spring is of considerable power, the device will not be operative. The counteracting spring, therefore, is a controlling factor in the operation of the conventional drum and band type of snubber, claims to the contrary notwithstanding.

The novelty of the present invention resides in the fact that no additional force, such, for instance, as the tension of a counteracting spring, is introduced to control the snubbing action. Frictional resistance to motion is still a factor, but the device operates on the principle of causing the force of the recoil itself to control the snubbing action. The force of the recoil is the force which actuates the device and, as such, it is a self-controlling force.

The advantages which it is the purpose of this invention to secure are numerous. In the first place, the invention is independent of the somewhat contradictory theories prevailing today as to when the resistance developed by a snubber should be maximum and when this resistance should be minimum. Some engineers believe that the resistance should be maximum at the beginning of the recoil movement and gradually decrease as this movement proceeds; others are of the opinion that the reverse condition should prevail, i. e., that the resistance should be minimum at the inception of the recoil, gradually increasing to a maximum as the recoil movement approaches its end; others, again, adhere to the idea that the resistance should be constant throughout the recoil movement; and some engineers have adopted the theory that the resistance should increase from the start of the recoil movement up to some intermediate stage and then decrease again, while others claim that it should begin with a decrease and end with an increase. In the present invention, all of these conditions and, in fact, any conceivable set of conditions as to the manner in which the restraint should develop may be satisfied by adopting a suitable shape for the revolving drum which constitutes one of the operating elements of the device, without in any manner departing from the broad principle underlying its operation, as this principle has been stated in the preceding paragraph.

Another advantage which it is the purpose of this invention to secure is regulation of the snubbing effect within a very wide range. One means of such regulation is obtained by regulation of the frictional resistance. In the preferred embodiment of the invention illustrated in the drawings, wherein the drum is a cylinder of circular cross section, the extent of frictional contact between the drum and the band is constant during the snubbing operation. Regulation of frictional resistance is provided by the simple means of enlarging or reducing the extent of the frictional contact. An important feature of this regulation is that the recoil movement is automatically arrested before it can become excessive. Additional means for regulating the snubbing effect is provided in that the position of the fulcrum about which the force of recoil exerts its self-restraining action may be varied, as, for instance, in the preferred form of the invention, by changing the eccentricity of the drum. The wide range within which the snubbing effect may be regulated by the combination of the above mentioned means results in a high degree of adaptability to a variety of conditions and a broadness of application which is not found in other devices of the same type.

It is also the purpose of this invention to eliminate the undesirable and troublesome feature of "preloading" characteristic of all drum and band type of snubbers with counteracting springs. Since there is no counteracting spring in the present invention, and the force of recoil is the controlling factor in the operation of the device, preloading, in the accepted meaning of the term, does not exist in the present case. It is true that the illustration reproduced in the drawings shows a spring for causing the drum to revolve, but the function of this spring is merely that of turning the drum to a position where it retains its close contact with the friction band, so as to take up the slack of the latter. In so far as the snubbing action of the device is concerned, this spring may be entirely disregarded. Indeed, once the drum has been brought back into close contact with the friction band, the spring could be disassociated from the drum. Such an arrangement is, of course, feasible and, if it is not adopted here, it is because it would introduce complications for which there is no justification in view of the negligible effect of the spring on the snubbing action of the device. Besides, the manner of taking up the slack of the friction band forms no part of the present invention. It need not be of the spring type. Many other standard ways of accomplishing the same result could be adopted. For instance, the position of the device might be reversed in the illustration shown herein, i. e. the terminals of the friction band could be secured to the body A, and the drum mounted on the body B, in which case the drum would assume the right position under the action of gravity, without any spring at all. The spring for taking up the slack of the band has been selected here for the purpose of illustration mainly because of its simplicity. It does not have to be powerful, like the counteracting spring in the conventional drum and band type of snubber. All it has to do is to turn the drum when there is practically no resistance to such turning beyond the small weight of the drum itself, and a comparatively weak spring will amply serve the purpose.

The conditions are vastly different from those obtaining in snubbers with counteracting springs where the rewinding operation must overcome a very high frictional resistance.

Even should one consider the tension of the slack eliminating spring in the present case as a form of preloading at least, it can be said for it that it is a minimum of preloading and that it is independent of load variations. For instance, in the case of a spring suspended vehicle, a light load means a stiffer vehicle spring, and a heavy load a softer vehicle spring. In accordance therewith, when the snubber is controlled by a counteracting spring, the preloading varies, and, usually, adjustments are necessary to bring the preloading factor in line with the variations in the load. In the present invention, if one were to call the slack eliminating spring a form of preloading, whatever preloading there may be would remain unaffected by variations in the load carried by the vehicle, and no adjustments are required.

Still another object of the present invention is to obtain prompt and positive action, with no possibility of initial slippage, even at times of unusually strong or sudden recoil movements. Such initial slippage is not unusual in snubbers of the conventional drum and band type (stationary drum, band winding and unwinding on the drum). Even if the flexible band is not actually slack immediately preceding the recoil movement, it is never fully stretched, and the interval of time during which it undergoes the stretching process within the limits of its elasticity, under the action of the tractive force, is necessarily accompanied by some slippage on the drum, because during this interval the contact friction between the band and the drum is not completely developed. In the present invention, the band is instantly pressed onto the drum at the very inception of the recoil movement, with the full force of the recoil and under a maximum of tension, before the drum is caused to rotate, so that no slippage can take place.

Another benefit to be derived from the present invention is easy standardization. A snubber built in accordance with this invention will serve similar mechanisms of various sizes and weights, as, for instance, motor vehicles of different manufacture or type, small or large, heavy or light, whereas in snubbers relying on a counteracting spring for the control of the snubbing action, the size and strength of the counteracting spring, which must correspond to the load on the vehicle spring, have to be designed to accord with the size and weight of the vehicle.

It is also the purpose of the present invention to extend the life of the snubber by reducing the main cause of wear therein. The above mentioned regulation of the frictional resistance permits one to obtain the desired snubbing effect with comparatively little friction between the drum and the band. Ability to use a low coefficient of friction further means that the device can be operated in lubricated condition, thus assuring not only long life, but smooth action. The slow, normal wear is automatically taken care of by a slight advance in the counter clockwise rotation of the drum impelled by the slack eliminating spring.

To the various purposes and advantages briefly enumerated above may be added the extraordinary simplicity of the device and its obviously low cost of manufacture. Some of these purposes will be further discussed in the course of the description of the invention which follows.

Figures 4, 5, 6, 7, 8, 9, 10, 11, 12, 13, 14:
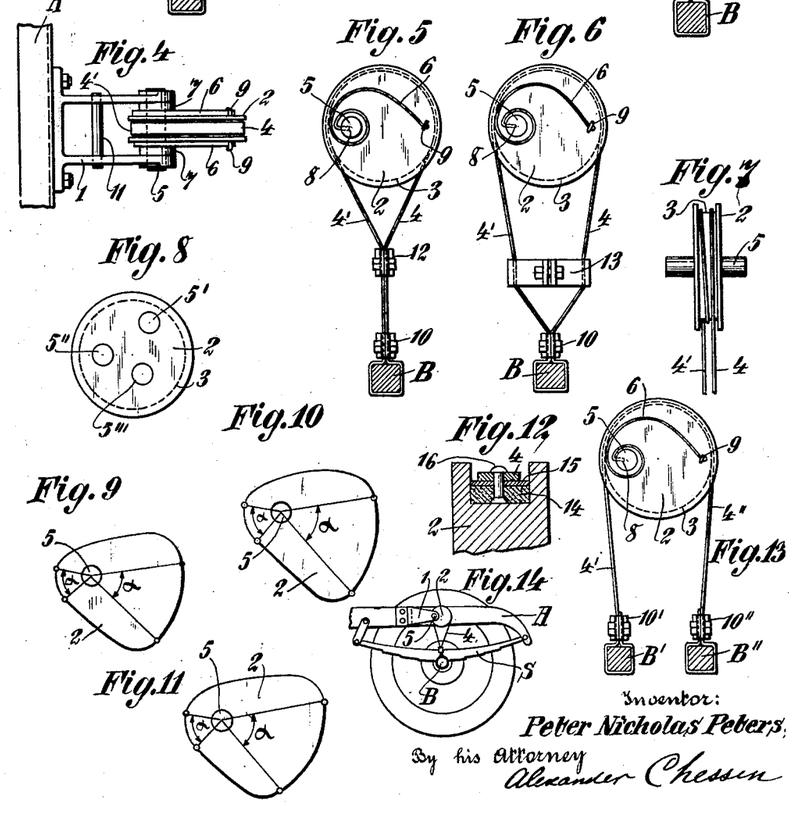
Figure 4 is a top view of the same device when in the position shown in Figure 1.
Figures 5 and 6 are front views of this device when provided with means for varying the arc of contact between the drum and the band.
Figure 7 is a side view of the drum part of the device showing a double winding of the band, as another means for increasing the arc of contact.
Figure 8 is a front view of a modified form of the drum, differing from the drum in Figures 1, 2 and 3 in that it has bearings for the axle on which the drum rotates at various distances from the central axis thereof.
Figures 9, 10 and 11 are front views of different cam shaped drums.
Figure 12 is a partial cross sectional view of a detail in the arrangement of the drum and band.
Figure 13 is a modification of the device in so far as the means for securing the ends of the band is concerned.
Figure 14 is a schematic view of the invention as applied to a spring suspended vehicle.

Referring to the drawings in detail, 1 is a bracket attached to a body A, which may be the frame of a spring suspended vehicle (Fig. 14). A cylindrical drum 2, of circular cross section, provided with a suitable groove 3 along its periphery for the admission of a flexible member 4, 4', which may be a friction band, a cord, or the like, is eccentrically mounted on the bracket 1 for rotation about the axle 5. As shown, the axle is fixed to the bracket 1, but, of course, the axle may be fixed to the drum and rotate in bearings provided therefor on the bracket. A spring 6, coiled around a sleeve 7 in such a manner as to keep the coil from being fouled by either the drum 2 or the arms of the bracket 1, is anchored at one end, 8, in the axle 5, and attached, at the other end, 9, to the drum. For the purpose of illustration, the spring 6 is shown exposed, because of the simplified drawing. In practice, I prefer to make the drum hollow, affording space within to accommodate the spring. The flexible member 4, 4', has its terminals secured in any suitable manner to a second body, B, which may be an axle of the vehicle having the frame A. In the drawings, the flexible member 4, 4', may be considered as having two ends firmly attached to the body B and joined together at 10. It is not essential that the two ends of the flexible member be attached to the body B jointly. In Figure 13 is shown a modification wherein each end portion of the flexible member is separately secured to the body B, one at B', and the other at B'', by means of separate clamps 10 and 10'. A stop, in the form of a cross bar 11 on the bracket 1, serves to limit the rotation of the drum 2 counter clockwise, the limiting position of the drum being indicated in dotted lines on Figure 1.

In Figures 5 and 6, the device is shown provided with means for varying the arc of contact between the drum 2 and the friction band 4, 4', the clamp 12, in one case (Fig. 5), serving to increase the length of this arc, while the separating member 13, in the other case (Fig. 6), effects a reduction in the length of the arc. Both devices are adjustable, as, for instance, by moving the clamps up or down. The variation in the length of the arc of contact between the drum and the band changes the frictional resistance to rotation of the drum. Another manner of increasing this frictional resistance is shown in Figure 7, wherein the flexible member is wound twice around the drum, while another way of diminishing the frictional resistance, similar in effect to that shown in Figure 6, may be seen in Figure 13.

The drum may be so designed as to permit variation in the degree of eccentricity. One way of accomplishing this is shown in Figure 8, wherein a series of bearings 5', 5'', 5''', for the axle 5 is provided, each bearing being disposed at a different distance from the periphery of the drum. By selecting one or another of these bearings for the axle 5, the eccentricity of the drum may be increased or diminished. Only three bearings are shown, but, obviously, their number may be increased. The drum is, in effect, a cam pivotally mounted on the body A. Its characteristic positions during the operation of the device are shown in the diagrammatic Figure 15, wherein the central axis of the drum, indicated by the letter C, has been assumed as stationary, and the pivotal axis as rotating relatively to the central axis, different positions of the pivotal axis being indicated by O, O', O''. This diagram illustrates only the relative positions of the central and the pivotal axes of the drum. It is, therefore, immaterial which one of them is assumed as stationary, and which one as rotating. The total angle of relative rotation in the course of normal operation is indicated in Figure 15 by the letter $\alpha$. The pull at the two ends of the flexible member 4, 4', is not exactly the same for certain positions of the drum, but the difference is slight, and we may assume, for the purpose of the following discussion, that it is exerted with equal force at both ends throughout the operation of the device. The pull is denoted in Figure 15 by P. It is applied to the drum, on one side, at the end of a lever arm which varies from $xO$ to $x''O''$, and, on the other side, at the end of a lever arm varying from $yO$ to $y''O''$. Denoting by $p$ the length of the lever arm on one side of the drum at any moment of the operation $$(p = xO, \ldots, x'O', \ldots, x''O''),$$

and by $p'$ the length of the lever arm on the other side at the same moment $$(p' = yO, \ldots, y'O', \ldots, y''O''),$$

it will be seen that a torque $T = Pp$ is applied to the drum on one side, tending to rotate it anticlockwise, and a torque $T' = Pp'$ on the other side, tending to rotate it clockwise. The net result is a differential torque $$T' - T = P(p' - p)$$

in the clockwise direction. It is clear from the diagram, Figure 15, that the difference $p' - p$ at first increases, as the pivotal axis moves from the position O to the position O', i. e., as the actual position of the drum changes from that shown in Figure 2 to that shown in Figure 1, after which the difference $p' - p$ decreases, as the pivotal axis moves from O' to O'', i. e., as the actual position of the drum changes from that illustrated in Figure 1 to that shown in Figure 3. By using a drum of different shape, the difference $p' - p$ may be made to follow a different law. Thus, in Figure 9, the cam shaped drum is formed so as to make $p$ and $p'$ constant within the normal range of rotation ($\alpha$) of the cam. In Figure 10, $p$ is constant, while $p'$ steadily increases within the normal range of operation (for the counter clockwise rotation of the cam); and in Figure 11, $p$ still being constant, $p'$ steadily increases when the cam rotates clockwise. Clearly, the shape of the cam may be formed so as to satisfy any manner of change imposed on the difference of the two lever arms $p$ and $p'$. The relative values of the two lever arms have an important bearing on the operation of the device, as will become clear when this operation is explained.

In Figure 12, a friction member 14 is interposed between the drum 2 and the flexible member 4, 4', with a protective strip 15, preferably of steel, between the flexible member 4, 4', and the friction member 14; the flexible member, the protective strip, and the friction member being secured together, as, for instance, by rivets 16. While a rectangular groove is shown in the drawing, it is obvious that the shape of the groove may be different, and that its surface may have various frictional coefficients when in contact with the flexible member or with the friction member 14.

In Figure 14, A is a portion of the frame of a spring suspended vehicle, B a wheel axle, and S a spring connection between the axle B and the portion A of the frame.

To illustrate the operation of the device, this operation will be explained as applied to a spring suspended vehicle, with especial reference to Figures 1, 2, 3 and 14.

Figure 1:
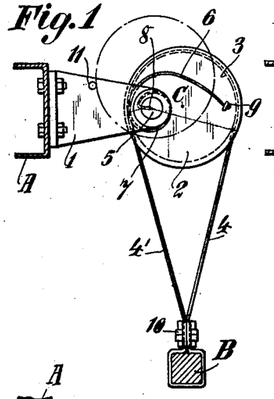
Figures 1, 2 and 3 are front views of the preferred form of my invention, at three different stages of its operation.

When the vehicle encounters an irregularity in its even path, the wheel axle B will be thrust upwards, compressing the spring S and, at the same time, causing the flexible member 4, 4', to loosen its grip on the drum 2. The slack of the flexible member 4, 4', is immediately taken up by the action of the drum 2 which, impelled by the spring 6 to turn (anticlockwise, in the illustration), closely follows the displacement of the flexible member, maintaining its frictional contact therewith. A comparatively weak spring may be used for thus taking up the slack of the flexible member 4, 4'. The position of the several parts of the device at the moment when the thrust is applied to the axle B is illustrated in Figure 1. During the first stage of operation, the snubber will gradually pass from the position shown in Figure 1 to that illustrated in Figure 2. When in the latter position, it is at the end of the first stage, and the movement of recoil commences. In passing from the position in Figure 1 to that in Figure 2, the drum 2, turning anticlockwise, has described an angle commensurate with the movement of the axle B relatively to the frame A of the vehicle and, therefore, commensurate with the amplitude of the oscillation of the spring S, within the normal range of operation of the device. The greater the upward thrust caused by the irregularity of the road, the greater will be the amplitude of the oscillation and the greater the angle described by the drum. As soon as the recoil movement commences, the downward pull of the force of recoil, transmitted to the drum through the flexible member 4, 4', will apply the opposite torques T and T' thereto, which action, as already explained, results in a net differential torque $T'-T$, or $P\ (p'-p)$, tending to rotate the drum clockwise. Since the flexible member 4, 4', has fixed terminals, it can not turn with the drum. Therefore, in rotating, the drum must overcome the frictional resistance along its arc of contact with the flexible member. The greater the length of the arc of contact, the greater is the braking effect on the drum.

Owing to the fact that the force of recoil is applied to the drum at points where it has opposite effects thereon, the flexible member 4, 4', takes its grip on the drum instantly and under full tension, i. e. the full grip of the flexible member on the drum necessarily precedes the clockwise rotation of the drum, so that no initial slippage occurs, which can not be said to be the case with other snubbers of the same type, as was pointed out.

The differential torque considered in the preceding discussion is the torque resulting directly from the pull exerted on the drum by the force of recoil. To this torque must be added that originating in the tension of the frictional resistance to rotation of the drum. From the mathematical theory of the device, the following expression of the final differential torque $\Delta T$ is obtained:

$$\Delta T = C(p' - e^{k\varphi}p)F$$

where F is the force of recoil; $\varphi$ the arc of contact between the flexible member and the drum, in radians; $k$ the coefficient of friction between the drum and the flexible member; and C a constant involving the values of $k$ and $\varphi$.

The smaller is the differential torque $\Delta T$, the greater is the snubbing effect, and vice versa. It will be seen from the above formula that the differential torque $\Delta T$ is proportional to the force of recoil F and to the difference $p'-pe^{k\varphi}$. In the course of a single swing of the oscillating motion of the resilient connection between two elements of a mechanism, such, for instance, as the spring S in Figure 14, the force F is maximum at the commencement of the recoil, gradually spending itself as the mechanism returns to a normal state. In the case of an eccentrically mounted drum of circular cross section, illustrated in Figures 1 to 3, the ratio of $p'$ to $p$ increases from the inception of the recoil movement until the mechanism passes through its normal state (illustrated in Figure 1), after which it decreases until the force of the recoil will have spent itself. The latter condition may be reached without departing far from the normal position, if the damping effect of the snubbing action is sufficiently strong. Accordingly, the difference $p'-pe^{k\varphi}$, and with it the differential torque $\Delta T$, will at first increase, if the difference $p'-pe^{k\varphi}$ increases at a more rapid rate than the rate of decrease of F, until the normal position is reached, whereupon the differential torque $\Delta T$ will rapidly decrease, because both of its variable factors are then decreasing. If, on the other hand, the decrease of the force F is more rapid than the increase of $p'-pe^{k\varphi}$, the differential torque $\Delta T$ will steadily decrease, at first slowly, then rapidly. I prefer to so construct the device that the first one of the two alternatives mentioned above will arise. In this case, the snubbing action will decrease from the moment of its inception until the normal position is reached and rapidly increase thereafter. This appears to be the condition most desired by manufacturers of motor cars. However, it is not my intention either to limit myself to satisfying the last mentioned condition, or even to insist on its preference, as the device is equally adapted to satisfying entirely other conditions.

If it is desired to modify the manner in which the differential torque $\Delta T$ progresses with the movement of recoil, a cam of suitable shape may be substituted for the eccentrically mounted drum of circular cross section, the changes in the differential torque following the changes of the lever arms $p$ and $p'$ as the cam rotates. The latter changes in the cases of the several cams shown in Figures 9, 10 and 11, have been previously discussed, and it is not necessary to follow the subject further in order to perceive the character of these and similar modifications of the device, or how they affect the operation of the snubber. It is to be understood, however, that the specific shapes shown in the drawings are merely illustrative.

It will be noted that the variation between the highest and the lowest values of the ratio $p'$ to $p$ will be more or less pronounced according as the angle $\alpha$ (normal range of rotation of the drum) is greater or smaller. There is, however, a value of this ratio for which the differential torque $\Delta T$ vanishes, viz. when $p'$ is equal to $pe^{k\varphi}$, as the above given formula shows, and when this minimum value of the ratio of $p'$ to $p$ is reached on the recoil movement, the device becomes temporarily locked, and the recoil movement is automatically arrested until the force of recoil will have spent itself and a reversal of the relative movement of the bodies A and B releases the lock. Thus, a timely stop is provided which effectively prevents the recoil movement from becoming excessive.

Means must be provided to prevent the drum from reaching a position for which the ratio of $p'$ to $p$ attains the above mentioned minimum value during its anticlockwise rotation under the action of the slack eliminating spring 6, when the upward thrust is applied to the body B, otherwise the device would become locked before it had a chance to operate. Such a means is always supplied, in the case of spring suspended vehicles, by a resilient stop either on the spring itself, or on the frame A, which prevents an excessive compression of the spring and, therefore, an undue angle of anticlockwise rotation of the drum. However, as an additional precaution, I may include a stop to the anticlockwise rotation of the drum in the present device. Such a stop, in the form of a cross bar 11 on the bracket 1, is shown in Figures 1 and 4, the limiting position of the drum being indicated in dotted lines in Figure 1.

It may be remarked, in passing, that the value of the ratio of $p'$ to $p$ for which the device becomes locked is attained before the drum can reach a dead center position either on the direct, or on the recoil movement.

The method of controlling the frictional resistance between the drum and the flexible member is extremely simple. It consists in varying the extent of the frictional contact between them. As is clear from the construction, in the case of the eccentrically mounted cylindrical drum of circular cross section, the arc of contact between the flexible member and the drum is constant throughout the operation. This constant arc of contact may be made larger or smaller, thus modifying the frictional resistance without changing the frictional coefficient. However, I do not mean to restrict myself to this particular method of changing the frictional resistance, nor to exclude changes of form or material of the groove in which the flexible member rests, or variations of the frictional coefficient. The method of varying the frictional resistance by lengthening or shortening the arc of contact is, however, so simple as to commend itself in particular. Means for doing so are shown in Figures 5 and 6, a movement up or down of the clamps 12 or 13 affording a wide range of variation.

Additional means for regulating the snubbing action is afforded by the possibility of varying the eccentricity of the drum. In Figure 8 a drum is shown with several bearings for the axle on which the drum is mounted for rotation, each at a different distance from the central axis of the drum. The closer the bearing is to this central axis, the smaller is the eccentricity of the drum, and the smaller, also, the ratio of the lever arms $p'$ and $p$. How changes in this ratio affect the differential torque $\Delta T$ and, through this torque, the snubbing effect, has been fully explained. The eccentrically mounted cylindrical drum of circular cross section being, in effect, a pivotally mounted cam, a change of eccentricity in such a drum is equivalent to a change in position of the pivots of the cam. Accordingly, changes similar to those produced by variations in the eccentricity of the drum 2 may be effected with any other cam by a suitable change in the position of its pivots.

The combination of the above described double means of regulation makes it possible to meet almost any imposed conditions as to the manner in which the snubbing effect should develop. For one thing, the development may be caused to be rapid, or gradual. For another, it readily adapts itself to lubricating conditions, i. e. to conditions under which the frictional coefficient is very low, because, no matter how low this coefficient may be, it is always possible to so select the eccentricity of the drum and the length of the arc of contact between the drum and the flexible member as to obtain a differential torque $\Delta T$ of the requisite value for producing the desired snubbing effect. That the manner in which the snubbing effect develops may be made to accord with any preconceived theory has already been explained. To meet any imposed condition, it is only necessary to properly select the various factors entering into the operation of the device, such as the shape of the cam, the position of its pivots, the length of the arc of contact between the cam and the flexible member, the angle of normal rotation of the cam. The possibility of operating the device under lubricating conditions is important inasmuch as the life of the device is extended thereby.

The wear in snubbers of the type here considered will naturally show itself mainly in the friction elements, i. e. the drum and the flexible member. In devices which depend on a counteracting spring for their operation, normal wear is taken care of by adjustment of the counteracting spring or by otherwise tightening the flexible member. It is a feature of the present invention that normal wear of the operating parts is automatically taken care of by the self adjustment of the drum in seeking its proper position under the action of the spring 6 when, owing to any normal wear of the friction elements, the slack of the flexible member is slightly increased. To provide for more extensive wear, a separate and easily replaceable friction member 14 and a protective strip 15 may be added, as illustrated in Figure 12.

Figure 2:
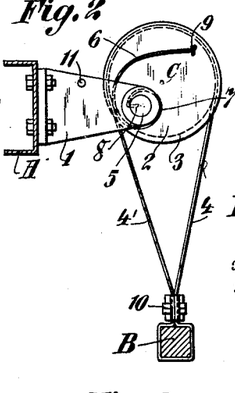
Figures 3, 15:
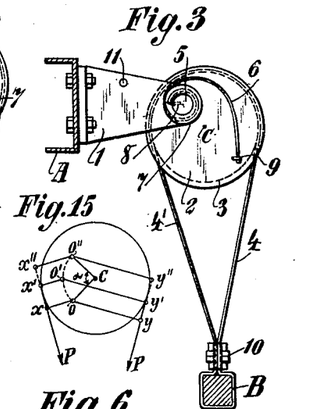
Figure 15 is a diagram illustrating the theory of the device.

It has been stated hereinbefore that Figures 1, 2 and 3 illustrate three characteristic positions of the device at the commencement or at the termination of definite stages of operation. It should be remembered, however, that under normal conditions the recoil will not extend as far as is indicated by the position of the drum in Fig. 3. Ordinarily, the position of the drum at the termination of the recoil movement will be somewhere between that shown in Figure 1 and that illustrated in Figure 3, the oscillation of the spring S (continuing the illustration as applied to a spring suspended vehicle) being damped by the snubbing effect of the device. On the other hand, the position of the drum, in its normal state, i. e. when the spring S is under normal tension, may be between that shown in Figure 1 and that shown in Figure 3, for instance, when the vehicle is carrying a load below normal, in which case, even taking into consideration the damping action of the snubber, the position at the termination of the recoil movement may be that illustrated in Figure 3. For this reason, the normal range of rotation of the drum, denoted in the drawings by the letter $\alpha$, may be taken as lying between the extreme limits indicated in Figures 2 and 3.

I claim:

1. In combination with two relatively movable bodies subject to the interaction of a force, a member movably connected to one of said bodies, means made operative by the relative motion of said bodies in one direction for causing said force to be applied to said member at points where the actions of said force on said member are opposing one another and setting said member in motion in differential response to the opposing actions of said force, and means for restraining the motion of said member.

2. In combination with two bodies having a resilient connection adapted to cause a recoil when said bodies are moved relatively to one another, a member movably connected to one of said bodies, means made operative by the relative motion of said bodies in one direction for causing said member to move, means made operative by the recoil from the relative motion of said bodies in said direction for causing the force of said recoil to be applied to said member at points where the actions of said force on said member are opposing one another and setting said member in reverse motion in differential response to the opposing actions of said force, and means for restraining said reverse motion.

3. In a device for damping relative oscillation of two spring connected elements of a mechanism, a movable member on one of said elements, means made operative by a swing of said oscillation for causing said member to move to an extent commensurate with the amplitude of said swing, and means made operative by the recoil from said swing for causing the force of said recoil to be applied to said member at points where the actions of said force on said member are opposing one another, the opposing actions of said force being in definite relation to the extent of the motion of said member.

4. In combination with two relatively movable bodies subject to the interaction of a force, a member rotatably mounted on one of said bodies, means made operative by the relative motion of said bodies in one direction for causing said force to be applied to said member at points where it is adapted to produce opposing torques thereon and setting said member in rotation in differential response to said opposing torques, and means for restraining the rotation of said member.

5. In combination with two bodies having a resilient connection adapted to cause a recoil when said bodies are moved relatively to one another, a member mounted for rotation on one of said bodies, means made operative by the relative motion of said bodies in one direction for causing said member to rotate, means made operative by the recoil from the relative motion of said bodies in said direction for causing the force of said recoil to be applied to said member at points where it is adapted to produce opposing torques thereon and setting said member in reverse rotation in differential response to said opposing torques, and means for restraining said reverse rotation.

6. In a device for damping relative oscillation of two spring connected elements of a mechanism, a member rotatably mounted on one of said elements, means made operative by a swing of said oscillation for causing said member to rotate to an angle commensurate with the amplitude of said swing, and means made operative by the recoil from said swing for causing the force of said recoil to be applied to said member at points where it is adapted to produce opposing torques thereon in definite relation to said angle.

7. In combination with two relatively movable bodies subject to the interaction of a force, a cam shaped member pivotally mounted on one of said bodies, flexible means made operative by the relative motion of said bodies in one direction for causing said force to be applied to said cam shaped member at points where it is adapted to produce opposing torques thereon and setting said cam shaped member in rotation in differential response to said opposing torques, and means for restraining the rotation of said cam shaped member.

8. In combination with two relatively movable bodies subject to the interaction of a force, a cylindrical drum eccentrically pivoted on one of said bodies, means made operative by the relative motion of said bodies in one direction for causing said force to be applied to said drum at points where it is adapted to produce opposing torques thereon and setting said drum in rotation in differential response to said opposing torques, and means for restraining the rotation of said drum.

9. In combination with two bodies having a resilient connection adapted to cause a recoil when said bodies are moved relatively to one another, a cam shaped member pivotally mounted on one of said bodies, means made operative by the relative motion of said bodies in one direction for causing said cam shaped member to rotate, flexible means made operative by the recoil from the relative motion of said bodies in said direction for causing the force of said recoil to be applied to said cam shaped member at points where it is adapted to produce opposing torques thereon and setting said cam shaped member in reverse rotation in differential response to said opposing torques, and means for restraining said reverse rotation.

10. In combination with two bodies having a resilient connection adapted to cause a recoil when said bodies are moved relatively to one another, a cylindrical drum eccentrically pivoted on one of said bodies, means made operative by the relative motion of said bodies in one direction for causing said drum to rotate, means made operative by the recoil from the relative motion of said bodies in said direction for causing the force of said recoil to be applied to said drum at points where it is adapted to produce opposing torques thereon and setting said drum in reverse rotation in differential response to said opposing torques, and means for restraining said reverse rotation.

11. In a device for damping relative oscillation of two spring connected elements of a mechanism, a cam shaped member pivotally mounted on one of said elements, means made operative by a swing of said oscillation for causing said cam shaped member to rotate to an angle commensurate with the amplitude of said swing, and flexible means made operative by the recoil from said swing for causing the force of said recoil to be applied to said cam shaped member at points where it is adapted to produce opposing torques thereon in definite relation to said angle.

12. In a device for damping relative oscillation of two spring connected elements of a mechanism, a cylindrical drum eccentrically pivoted on one of said elements, means made operative by a swing of said oscillation for causing said drum to rotate to an angle commensurate with the amplitude of said swing, and means made operative by the recoil from said swing for causing the force of said recoil to be applied to said drum at points where it is adapted to produce opposing torques thereon and produce a differential torque in definite relation to said angle.

13. In combination with two relatively movable rigid bodies subject to the interaction of a force, a member movably connected to one of said bodies, and means originating and terminating in the other one of said bodies for transmitting said force to said member at points where the actions of said force on said member are opposing one another.

14. In combination with two resiliently connected rigid bodies, a member movably connected to one of said bodies, and means originating and terminating in the other one of said bodies for transmitting the resilient action between said bodies to said member at points where the force of recoil from said resilient action acts upon said member in opposing directions.

15. In combination with two relatively movable bodies under the action of a force, a member rotatably mounted on one of said bodies, and means originating and terminating in the other one of said bodies for transmitting said force to said member at points where said force applies opposing torques thereto.

16. In combination with two resiliently connected bodies, a cam shaped member mounted for rotation on one of said bodies, and connecting means to said cam shaped member originating and terminating in the other one of said bodies, responsive to the resilient action between said bodies, for causing the force of recoil therefrom to control the rotation of said cam shaped member.

17. In combination with two relatively movable bodies subject to the interaction of a force, a cylindrical drum eccentrically pivoted on one of said bodies, and connecting means to said drum originating and terminating in the other one of said bodies, responsive to the relative motion of said bodies, for causing said force to control the rotation of said drum.

18. In combination with two spring connected elements of a mechanism, a cylindrical drum eccentrically pivoted on one of said elements, and connecting means to said drum originating and terminating in the other one of said elements, responsive to the action of said spring, for causing the force of recoil therefrom to control the rotation of said drum.

19. In combination with two relatively movable bodies subject to the interaction of a force, a member movably attached to one of said bodies, and connecting means originating and terminating in the other one of said bodies adapted to have a resilient grip on said member when the relative motion of said bodies is in one direction for causing said force to move said member against said resilient grip.

20. In combination with two relatively movable bodies subject to the interaction of a force, a member rotatably mounted on one of said bodies, and connecting means originating and terminating in the other one of said bodies adapted to have a frictional grip on said member when the relative motion of said bodies is in one direction for causing said force to rotate said member against said frictional grip.

21. In combination with two spring connected elements of a mechanism, a cam shaped member rotatably mounted on one of said elements, and connecting means originating and terminating in the other one of said elements adapted to have a resilient grip on said cam shaped member when said elements are under the action of a recoil from a swing for causing the force of said recoil to rotate said cam shaped member against said resilient grip.

22. In combination with two resiliently connected bodies, a cylindrical drum eccentrically pivoted on one of said bodies, and connecting means originating and terminating in the other one of said bodies adapted to have a frictional grip on said drum when said bodies are under recoil from a relative motion in a certain direction for causing the force of said recoil to rotate said drum against said frictional grip.

23. In a snubber, the combination with two relatively movable elements, of a cam shaped member mounted for rotation on one of said elements, and power transmission means having its terminals at the other one of said elements and adapted to grip said cam shaped member when said bodies move relatively to one another in one direction.

24. In a snubber, the combination with two relatively movable elements, of a cam shaped member rotatable about a fixed point on one of said elements, and power transmission means having its terminals secured to the other one of said elements and adapted to frictionally grip said cam shaped member when the relative motion of said elements is in one direction.

25. In a snubber, the combination with two relatively movable elements, of a cylindrical drum eccentrically pivoted on one of said elements, and a flexible member having its terminals at the other one of said elements and adapted to grip said drum when the relative motion of said elements is in one direction.

26. In a snubber, the combination with two spring connected elements, of a cylindrical drum eccentrically pivoted on one of said elements, and a flexible member having its ends secured to the other one of said elements and adapted to circumferentially grip said drum when said elements are under recoil from the direct action of said spring.

27. In a snubber, the combination with two resiliently connected elements, of a cylindrical drum eccentrically mounted for rotation about a fixed point on one of said elements, and a flexible member having its ends secured to the other one of said elements and adapted to be circumferentially in frictional contact with said drum when said elements recoil from a movement due to their resilient connection.

28. In a snubber, the combination with two relatively movable elements, of a member movably mounted on one of said elements, force transmission means to said member having its terminals at the other one of said elements adapted to be slack or taut according as the relative motion of said elements is in one or in the opposite direction, and means for taking up the slack of said transmission means by motion of said member.

29. In a snubber, the combination with two relatively movable elements, of a member rotatably mounted on one of said elements, a flexible connection with said member having its terminals at the other one of said elements adapted to be slack or taut according as the relative motion of said elements is in one or in the opposite direction, and spring actuated means for taking up the slack of said flexible means.

30. In combination with two relatively movable bodies, a cam shaped member rotatable about a fixed point on one of said bodies, flexible connecting means with said cam shaped member having its terminals secured to the other one of said bodies adapted to be slack or taut according as the relative motion of said bodies is in one or in the opposite direction, and means for taking up the slack of said flexible connecting means by causing said cam shaped member to rotate.

31. In combination with two relatively movable elements of a mechanism, a cylindrical drum eccentrically mounted for rotation on one of said elements, a flexible member connecting said drum to the other one of said elements and having its ends secured thereto, said flexible member being adapted to be slack or taut according as the relative motion of said elements is in one or in the opposite direction, and spring actuated means for rotating said drum and causing it to take up the slack of said flexible member.

32. In combination with two relatively movable bodies, means connecting said bodies and comprising a rigid member movably attached to one of said bodies and a flexible connection with said rigid member having its terminals at the other one of said bodies adapted to be slack or taut according as the relative motion of said bodies is in one or in the opposite direction, means for taking up the slack of said flexible connection by causing said rigid member to move, and means for limiting the motion of said rigid member.

33. In a device for controlling relative motion of two bodies, a cylindrical drum eccentrically mounted for rotation on one of said bodies, means limiting said rotation in one direction, and a flexible connection with said drum having its terminals at the other one of said bodies made operative by the relative motion of said bodies in one direction.

34. A mechanism for snubbing the relative motion of two elements comprising a rigid member movably attached to one of said elements, flexible means having its terminals at the other one of said elements adapted to have a sliding grip on said rigid member when the relative motion of said bodies is in one direction, and means for controlling the strength of said grip.

35. A mechanism for snubbing the relative motion of two elements comprising a rigid member rotatably mounted on one of said elements, flexible means having its terminals at the other one of said elements adapted to have a sliding grip on said rigid member when the relative motion of said elements is in one direction, and means for varying the strength of said grip.

36. In combination with two relatively movable bodies, a cylindrical drum eccentrically pivoted on one of said bodies, flexible means having its terminals secured to the other one of said bodies adapted to have a grip on said drum when the relative motion of said bodies is in one direction, and means for controlling the strength of said grip.

37. In a snubber, the combination with two relatively movable elements, of a rigid member movably attached to one of said elements, a braking device for said rigid member operative when the relative motion of said elements is in one direction originating and terminating in the other one of said elements, and means for controlling said braking device.

38. In a snubber, the combination with two relatively movable elements, of a member rotatably mounted on one of said elements, means for braking the rotation of said member made operative by the relative motion of said elements in one direction originating and terminating in the other one of said elements, and means for controlling said braking means.

39. In a snubber, the combination with two relatively movable elements, of a cam shaped member rotatably mounted on one of said elements, flexible means having its terminals at the other one of said elements adapted to brake the rotation of said cam shaped member when the relative motion of said elements is in one direction, and means for controlling the braking effect of said flexible means.

40. In combination with two relatively movable bodies, a cam shaped member rotatably mounted on one of said bodies, flexible means having its terminals at the other one of said bodies adapted to frictionally grip said cam shaped member when the relative motion of said bodies is in one direction, and means for controlling the friction between said flexible means and said cam shaped member.

41. In combination with two relatively movable bodies, a cylindrical drum eccentrically pivoted on one of said bodies, means originating and terminating at the other one of said bodies adapted to brake the rotation of said drum when the relative motion of said bodies is one direction, and means for controlling said braking means.

42. In a snubber, the combination with two relatively movable elements, of a cylindrical drum eccentrically mounted for rotation on one of said elements, flexible means having its terminals at the other one of said elements adapted to be circumferentially in frictional contact with said drum when the relative motion of said elements is in one direction, and means for varying the extent of said frictional contact.

43. In combination with two relatively movable bodies subject to the interaction of a force, a member movably mounted on one of said bodies, means connecting the other one of said bodies with said member for transmitting said force thereto in one direction at points where said force applies opposing torques of different intensity to said member, and means for varying the differential action of said force at said points.

44. In combination with two bodies capable of relative motion subject to the interaction of a force, a member rotatably mounted on one of said bodies, means connecting the other one of said bodies to said member for transmitting said force thereto in one direction at points where it is adapted to apply opposite torques of different magnitude of said member, and means for varying the difference between said opposite torques.

45. In combination with two bodies capable of relative motion subject to the interaction of a force, a cam shaped member pivoted on one of said bodies, flexible means connecting the other one of said bodies to said cam shaped member for transmitting said force thereto in one direction at points where it is adapted to apply opposite torques of different magnitude to said cam shaped member, and means for varying the difference between said opposite torques by changing the position of said cam shaped member relatively to its pivots.

46. In combination with two bodies capable of relative motion subject to the interaction of a force, a cylindrical drum pivotally mounted on one of said bodies, flexible means connecting the other one of said bodies to said drum for transmitting said force thereto in one direction at points where it is adapted to apply opposite torques of different magnitude to said drum, and means for varying the difference between said torques by changing the eccentricity of said drum.

47. In combination with two relatively movable bodies subject to the interaction of a force, a member movably connected to one of said bodies, and means for transmitting said force to said member at points where the actions of said force on said member are opposing one another, thereby producing a differential action, the points of application of said force varying as said member moves and conforming to predetermined variations of said differential action.

48. In combination with two resiliently connected bodies, a member movably connected to one of said bodies, and means for transmitting the force of recoil from the resilient action between said bodies to said member at points where the actions of said force on said member are opposing one another, thereby producing a differential action, the points of application of said force varying as said member moves and conforming to predetermined variations of said differential action.

49. In combination with two relatively movable bodies subject to the interaction of a force, a member rotatably mounted on one of said bodies, and means for transmitting said force to said member at points where said force applies opposing torques thereto, thereby producing a differential torque, the points of application of said force varying as said member rotates and conforming to predetermined variations of said differential torque.

50. In combination with two relatively movable bodies subject to the interaction of a force, a cylindrical drum eccentrically pivoted on one of said bodies, and means for transmitting said force to said drum at points where said force applies opposing torques thereto, thereby producing a differential torque, the eccentricity of said drum conforming to predetermined variations of said differential torque.

51. In combination with two relatively movable bodies subject to the interaction of a force, a cam shaped member rotatably mounted on one of said bodies, and means for transmitting said force to said cam shaped member at points where said force applies opposing torques thereto, thereby producing a differential torque, the shape of said cam shaped member conforming to predetermined variations of said differential torque.

PETER NICHOLAS PETERS.